US008914445B2

(12) United States Patent
Sarikaya et al.

(10) Patent No.: US 8,914,445 B2
(45) Date of Patent: Dec. 16, 2014

(54) SYSTEM AND METHOD FOR DIAMETER PREFIX AUTHORIZATION

(75) Inventors: Behcet Sarikaya, Wylie, TX (US); Yang Song Xia, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 336 days.

(21) Appl. No.: 12/250,803

(22) Filed: Oct. 14, 2008

(65) Prior Publication Data

US 2009/0106385 A1    Apr. 23, 2009

Related U.S. Application Data

(60) Provisional application No. 60/980,712, filed on Oct. 17, 2007.

(51) Int. Cl.
| | | |
|---|---|---|
| G06F 15/16 | (2006.01) | |
| H04M 3/00 | (2006.01) | |
| H04L 29/12 | (2006.01) | |
| H04W 8/26 | (2009.01) | |
| H04L 29/06 | (2006.01) | |
| H04W 80/04 | (2009.01) | |

(52) U.S. Cl.
CPC ............ *H04L 61/2053* (2013.01); *H04W 8/26* (2013.01); *H04L 61/6059* (2013.01); *H04L 29/12226* (2013.01); *H04L 63/0892* (2013.01); *H04L 29/12301* (2013.01); *H04W 80/04* (2013.01); *H04L 63/12* (2013.01); *H04L 61/2015* (2013.01); *H04L 61/6068* (2013.01); *H04L 29/12273* (2013.01); *H04L 29/12933* (2013.01); *H04L 61/2076* (2013.01)
USPC ........... 709/206; 709/203; 709/229; 709/245; 379/355.08

(58) Field of Classification Search
USPC .................................... 709/206, 229
See application file for complete search history.

(56) References Cited

U.S. PATENT DOCUMENTS

| | | | | |
|---|---|---|---|---|
| 2003/0182445 | A1* | 9/2003 | Smith et al. ................... | 709/238 |
| 2004/0179539 | A1* | 9/2004 | Takeda et al. ................. | 370/401 |

(Continued)

FOREIGN PATENT DOCUMENTS

| | | |
|---|---|---|
| CN | 1682517 A | 10/2005 |
| CN | 1794737 A | 6/2006 |

(Continued)

OTHER PUBLICATIONS

Calhoun, "Diameter Base Protocol", Sep. 2003, Network Working Group, http://www.ietf.org/rfc/rfc3588.txt.*

(Continued)

*Primary Examiner* — Ranodhi Serrao
*Assistant Examiner* — Farrukh Hussain
(74) *Attorney, Agent, or Firm* — Slater & Matsil, L.L.P.

(57) ABSTRACT

The invention provides a method for Diameter prefix authorization. The method includes sending a request for a prefix by a Prefix Authorization (PA) client or Diameter client to a Prefix Authorization (PA) server or Diameter server. The method also includes replying with an answer message by the PA server to the PA client to provide a first prefix with a first lifetime. The invention further includes a method for initiating IPv6 address renumbering by sending a message for renumbering from the PA server. The method also includes receiving the message by the PA client and sending a message to the PA server to acquire a second prefix. The method further includes receiving the second prefix from the PA server with an answer message with a second lifetime, where the second prefix is different from the first prefix.

33 Claims, 4 Drawing Sheets

(56) References Cited

U.S. PATENT DOCUMENTS

| | | | |
|---|---|---|---|
| 2005/0147084 A1* | 7/2005 | Zhang et al. | 370/352 |
| 2005/0267983 A1 | 12/2005 | Ksinant et al. | |
| 2006/0028285 A1* | 2/2006 | Jang et al. | 333/1 |
| 2006/0080728 A1* | 4/2006 | Wen et al. | 726/4 |
| 2006/0159086 A1 | 7/2006 | Bras et al. | |
| 2006/0248202 A1* | 11/2006 | Blanchet et al. | 709/227 |
| 2007/0124592 A1 | 5/2007 | Oyama | |
| 2007/0230453 A1* | 10/2007 | Giaretta et al. | 370/389 |

FOREIGN PATENT DOCUMENTS

| | | |
|---|---|---|
| CN | 1870644 A | 11/2006 |
| CN | 102017563 B | 3/2013 |
| WO | WO 2006/046261 A1 | 5/2006 |
| WO | WO 2007/001231 A2 | 1/2007 |

OTHER PUBLICATIONS

Baker, Lear, Drome, "Procedures for Renumbering an IPv6 Network without a Flag Day", Sep. 2005, The Internet Society (2005), Request for Comments 4192, All.*

Bradner, S., "Key Words for Use in RFCs to Indicate Requirement Levels," RFC 2119, 3 pages, Mar. 1997.

Calhoun, P. et al., "Diameter Base Protocol," The Internet Society, RFC 3588, 147 pages, Sep. 2003.

Devarapalli, V. et al., "Network Mobility (NEMO) Basic Support Protocol," The Internet Society, RFC 3963, 33 pages, Jan. 2005.

Droms, Ralph et al., "DHCPv6 Prefix Delegation for NEMO," nemo WG, IETF 65, 6 pages, Mar. 22, 2006.

Eronen, P. et al., "Diameter Extensible Authentication Protocol (EAP) Application," The Internet Society, RFC 4072, 33 pages, Aug. 2005.

Fajardo, V. et al., "Diameter Applications Design Guidelines," The IETF Trust, 17 pages, Jul. 13, 2008.

Gundavelli, S. et al., "Proxy Mobile IPv6," The IETF Trust, RFC 5213, 96 pages, Aug. 2008.

Madanapalli, S., "Analysis of IPv6 Link Models for IEEE 802.16 Based Networks," The IETF Trust, RFC 4968, 16 pages, Aug. 2007.

Patil, B. et al., "Transmission of IPv6 Via the IPv6 Convergence Sublayer Over IEEE 802.16 Networks," The IETF Trust, RFC 5121, 22 pages, Feb. 2008.

Rigney, C. et al., "Remote Authentication Dial in User Service (RADIUS)," The Internet Society, RFC 2865, 76 pages, Jun. 2000.

Salowey, J. et al., "Radius Delegated-IPv6-Prefix Attribute," The IETF Trust, RFC 4818, 7 pages, Apr. 2007.

Troan, O. et al., "IPv6 Prefix Options for Dynamic Host Configuration Protocol (DHCP) Version 6," The Internet Society, RFC 3633, 19 pages, Dec. 2003.

Droms, R., "Dynamic Host Configurations Protocol," IETF Standard, Network Working Group, Request for Comments: 2131 (rfc2131), Obsoletes: 1541, Category: Standards Track, XP 015007915, Mar. 1997, 46 pages, Internet Engineering Task Force.

Droms, R., et al., "Dynamic Host Configuration Protocol for IPv6 (DHCPv6)," IETF Standard, Network Working Group, Request for Comments: 3315 (rfc3315), Category: Standards Track, XP 015009185, Jul. 2003, 101 pages, The Internet Society.

Korhonen, J., et al., "Diameter Mobile IPv6: Support for Network Access Server to Diameter Server Interaction; draft-ietf-dime-mip6-integrated-05.txt," IETF Standard-Working-Draft, Diameter Maintenance and Extensions (DIME), Internet-Draft, Intended status: Standards Track, XP 015051166, Jul. 9, 2007, 20 pages, The IETF Trust.

Droms, R., et al., "DHCPv6 Prefix Delegation for NEMO; draft-ieft-nemo-dhcpv6-pd-03," IETF Standard-Working-Draft, IPv6 Group, Internet-Draft, Intended status: Informational, Dec. 6, 2007, 12 pages, The IETF Trust.

Sarikaya, B., et al., "Problem Statement and Requirements for Diameter/Radius Prefix Authorization Application; draft-sarikaya-dimeradext-prefix-auth-ps-00.txt," IETF Standard-Working-Draft, Network Working Group, Internet-Draft, Jul. 6, 2008, 12 pages, The IETF Trust.

Li, Y., et al., "Extended Remote Authentication Dial in User Service (RADIUS) Attributes; draft-ietf-radext-extended-attributes-04.txt," IETF Standard-Working-Draft, Network Working Group, Internet-Draft, Intended status: Informational, Jul. 7, 2008, 14 pages, The IETF Trust.

International Search Report, International Application No. PCT/CN2008/072739, Date of completion: Jan. 12, 2009, 3 pages.

Written Opinion of the International Searching Authority, International Application No. PCT/CN2008/072739, Applicant: Huawei Technologies Co., Ltd., et al., Date of mailing: Jan. 22, 2009, 6 pages.

Supplementary European Search Report, European Application No. 08841743.1-1525, Applicant: Huawei Technologies Co., Ltd., Dated: Oct. 21, 2010, 7 pages.

Chen, Neng-Gan, et al., "Design and implementation of AAA server based on diameter protocol," Computer Engineering and Design, vol. 25, No. 12, Dec. 2004, pp. 2274-2276 (English Translation included).

First Office Action of Chinese Application No. 200880100281.0, mailed Jun. 12, 2012, 11 pages.

* cited by examiner

| Attribute Name | AVP Defined Code | Value Type | AVP Flag rules | | | | |
|---|---|---|---|---|---|---|---|
| | | | MUST | MAY | SHOULD NOT | MUST NOT | MAY Encrypt |
| PrefiUserID | TBD | Unsigned64 | M | P | | V | N |
| Prefix-Authorization | TBD | OctetString | M | P | | V | Y |

Fig. 3

SYSTEM AND METHOD FOR DIAMETER PREFIX AUTHORIZATION

CROSS-REFERENCES TO RELATED APPLICATIONS

This patent application is a nonprovisional of U.S. provisional patent application Ser. No. 60/980,712, entitled "SYSTEM AND METHOD FOR DIAMETER PREFIX DELEGATION," filed Oct. 17, 2007, the disclosure of which is incorporated herein by reference for all purposes.

TECHNICAL FIELD OF THE INVENTION

The present invention relates generally to telecommunications, and more particularly, to a system comprising various methods for the diameter application of prefix authorization.

BACKGROUND OF THE INVENTION

Prefix management has been used or recommended in conventional methods and some protocols. However, the conventional methods or protocols have some disadvantages.

In this specification, reference is sometimes made to references cited in full and incorporated by reference at the end of this specification; such references are identified using square brackets in the text.

[RFC4968] provides different IPv6 link models that are suitable for IEEE 802.16 based networks. [RFC4968] also provides analysis of various considerations for each link model. [RFC4968] further includes applicability of each link model under different deployment scenarios. As to IPv6 addressing, a shared link model and a point-to-point link model are commonly used. In the shared link model, an IPv6 prefix is shared by multiple mobile nodes (MN). On the other hand, a prefix is only assigned to one MN in the point-to-point link model. Different mobile nodes (MNs) cannot share a prefix, but an MN may have multiple prefixes.

[RFC5121] specifies addressing and operation of IPv6 over a IPv6 specific part of a packet convergence sub-layer of IEEE Std 802.16e [802.16e]. A point-to-point link model may be used in [RFC5121]. Also, 3GPP and 3GPP2 have adapted the point-to-point link model.

A Proxy Mobile IPv6 protocol enables mobility support to a host without requiring participation of the host in any mobility related signaling as described in [RFC5213]. A point-to-point access link is supported in [RFC5213]. The mobile node and a Mobile Access Gateway (MAG) are assumed to be the only two nodes on the point-to-point access link. Proxy Binding Update and Proxy Binding Acknowledgement are used for prefix authorization among a Local Mobility Anchor (LMA) and the Mobile Access Gateway (MAG).

One protocol [RFC3963] specifies a mechanism for a Mobile Router to synchronize Mobile Network prefixes of the Mobile Router (user) with Home Agents (client) and obtains new prefixes dynamically. However, the protocol does not deal with how to manage the prefix at a backend.

[RFC3633] defines Prefix Authorization (PA) options to provide a mechanism for automated delegation of IPv6 prefixes using the Dynamic Host Configuration Protocol (DHCP). [I-D.ietf-nemo-dhcpv6-pd] describes how DHCPv6 PD can be used by mobile routers and home agents in network mobility.

Yet another protocol defines Prefix Authorization options to provide a mechanism for automated delegation of IPv6 prefixes using the Dynamic Host Configuration Protocol (DHCP). However, this protocol does not have a mechanism for prefix management using Diameter. DHCPv6 prefix authorization is defined in RFX 3633.

Still another protocol [RFC4818] defines Delegated-IPv6-Prefix RADIUS attribute/Diameter Attribute-Value Pair (AVP) such that in DHCPv6, a delegating router can receive prefixes from an Authentication, Authorization and Accounting (AAA) server. In this case, the AAA server passively delegates the prefixes to the delegating router. However, the AAA server does not have any control over the prefixes in cases such as renumbering.

Therefore, there is a need for improvement in prefix management. There is also a need of systems and methods for the application of Diameter prefix authorization in home agents in MIPv6 and NEMO scenario, local mobility anchors in Proxy MIPv6 scenario, or other common access routers, to enable clients including home agents, local mobility anchors, and access routers to manage prefix efficiently.

BRIEF SUMMARY OF THE INVENTION

The present invention discloses versatile systems and methods for a Diameter application for prefix authorization. Embodiments of the present invention enable methods in which a client requests prefixes from a server; the client provides the prefixes with lifetime to the server; and the client may renew the prefixes when the lifetime is expiring. Diameter clients may be home agents in MIPv6 and NEMO scenario, local mobility anchors in Proxy MIPv6 scenario, or common access routers.

Embodiments of the invention provide a method for Diameter prefix authorization. The method includes sending a request for a prefix by a Prefix Authorization (PA) client or Diameter client to a Prefix Authorization (PA) server or Diameter server. The method also includes replying with an answer message by the PA server to the PA client to provide a first prefix with a first lifetime.

Another set of embodiments of the invention further includes a method for initiating IPv6 address renumbering by sending a message for renumbering from the PA server. The method also includes receiving the message by the PA client and sending a message to the PA server to acquire a second prefix. The method further includes receiving the second prefix from the PA server with an answer message with a second lifetime, where the second prefix is different from the first prefix.

Embodiments of the invention further provide a device for Diameter Application for prefix authorization. The device includes a processor, at least two or more network interfaces, and a memory coupled with the processor where the memory includes a computer-readable medium having a computer-readable program for directing operation of the device. The computer readable program includes instructions for sending a request message for prefix authorization and instructions for receiving an answer message, where the answer message includes a first prefix with a first lifetime.

Embodiments of the invention also provide a Diameter application for prefix authorization using Diameter [I-D.ietf-dime-rfc3588bis] and [I-D.ietf-dime-app-design-guide]. This application enables full prefix authorization functionality to the AAA server.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates Diameter AVPs.

DETAILED DESCRIPTION OF THE INVENTION

Figure 1:
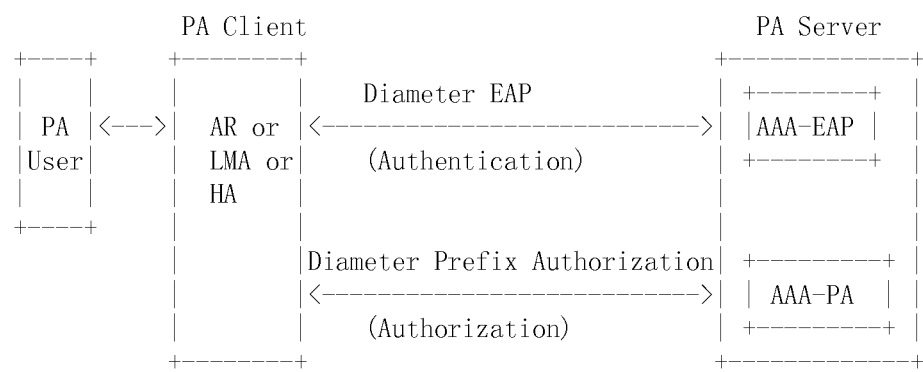
FIG. 1 is a schematic diagram illustrating an architecture of a diameter application according to the present invention.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Embodiments of the invention include a Diameter application for prefix authorization. In this application, a Diameter client may request prefixes from a server by using a Diameter protocol. The Diameter client may give back the prefixes to a Diameter server. The client is responsible for renewing the prefixes when lifetime for the prefixes expires. The Diameter server may also renumber prefixes. The Diameter client may be home agents (HA) in MIPv6 and NEMO scenario. The Diameter client may also be local mobility anchors in Proxy MIPv6 scenario. The Diameter client also includes common access routers. Some terminologies are described below according to embodiments of the present invention.

Prefixes for Authorization (Authorized-Prefix) are assigned to an AAA client. Each Authorized-Prefix has an associated Prefix User Identifier (PrefixUserID). The AAA client may be assigned more than one Authorized-Prefix. For example, the AAA client may have multiple access users. One Authorized-Prefix is assigned for each of access users.

A main prefix is called an aggregate prefix. In a point-to-point Link Model, an access router (AR) broadcasts prefixes (i.e. MN's route information) dynamically upstream, which may cause high routing protocol traffic (for example, OSPF, etc.). To solve the problem, route aggregation is used. For example, each access router (AR) may be assigned a 48-bits aggregate prefix, while a 64-bits prefix may be derived from extension of the 48-bits aggregate prefix. The AR only broadcasts the aggregate prefix upstream. The aggregate prefix may be extended to generate a pool of dedicated prefixes.

Dedicated prefix is a unique prefix used by a mobile node (MN) in a point-to-point Link Model. The dedicated prefix belongs to an aggregate prefix. The dedicated prefix may never be broadcasted by routing protocol. An AAA client may request a dedicated prefix along with the corresponding aggregate prefix from an AAA server. Using the corresponding aggregate prefix information, the AAA client may broadcast upstream the MN's route information.

Prefix Authorization Client (PA Client) is a Diameter Client that is responsible for exchange with a Diameter Server to fulfill prefix request, prefix release, prefix renew and prefix renumbering functions. The PA client may be a home agent (HA) for allocating prefix for mobile routers. The PA client may also be a local mobility anchor (LMA) in Proxy Mobile IPv6 (PMIPv6) scenario for managing dedicated prefixes of MN, or an access router in the point-to-point link model.

Prefix Authorization Server (PA Server) is a Diameter Server that is responsible for exchange with a Diameter Client to fulfill functions of prefix request, prefix release, prefix renew and prefix reconfiguration. The PA server may be collocated with a Diameter authentication server. The PA server may also be a separated server for managing prefix.

Prefix Authorization User (PA User) is an end user of prefixes. The PA user may be a mobile node (MN) which configures prefixes from a local mobility anchor (LMA) in a PMIPv6 scenario. The PA user may also be a mobile router, or a MN which requests prefixes in a visited network.

FIG. 1 shows an architecture of one embodiment of the present invention. Use of Extensible Authentication protocol (EAP) and existence of Diameter EAP application as described in [RFC4072] have made the Diameter community to be able to separate an act of authentication from an act of authorization. In a particular embodiment of the invention, prefix authorization is a type of authorization. First, the PA user (e.g. MN) and the PA client run an EAP with the AAA server using the Diameter EAP application for authentication, which is followed by a service authorization process for prefix authorization.

To explicitly authorize the prefix authorization, a new Diameter application is described according to the embodiments of the invention. The application requires new messages, such as Prefix-Authorize-Request (PAR), Prefix-Authorize-Answer (PDA), Prefix-Authorize-Release (PAS), Prefix-Authorize-Renew (PAW) and Prefix-Authorize-Reconfigure (PAC).

According to embodiments of the invention, a PA Client may send a Prefix-Authorize-Request (PAR) message containing identity of a PA user to a PA server for prefix request. In one embodiment, the PA client may request an aggregate prefix, and then may subnet the aggregate prefix to the PA user. In another embodiment of the invention, the PA client may request a dedicated prefix. The PA server may allocate one or more prefixes for the PA client using a Prefix-Authorize-Answer (PAA) message. Lifetime for the prefixes is included in the PAA message.

When the PA User detaches the PA Client, the prefixes allocated to the PA user may be released. A Prefix-Authorize-Release (PAS) message is sent by the PA Client to the PA Server. The PA server may reply a Prefix-Authorize-Answer (PAA) message to confirm reception of the PAA message and verify the release of the prefixes.

According to embodiments of the invention, clients or home agents may manage the prefixes. When a user such as mobile node (MN) attaches an Access Router (AR), the AR may request one or more prefixes for the MN. When the mobile node (MN) detaches the access router (AR), the prefixes may be released. The access router (AR) may offload prefix management to a dedicated server.

When a first lifetime for the prefixes expires, the PA client may extend the lifetime for the prefixes by sending a Prefix-Authorize-Renew message to the PA server. The PA server may send a Prefix-Authorize-Answer message with a second lifetime for the prefixes. The second lifetime may be different from the first lifetime for the same prefixes. In an embodiment, the PA client may send the renew message after the first lifetime expires to acquire a second lifetime of a first prefix.

According to embodiments of the invention, prefixes with lifetime may allow increased usage or capacity for the dedicated server to provide prefixes to more clients or users. When the lifetime of prefixes expires, new lifetime may be provided to extend the usage of the prefixes for a client.

Figure 2:
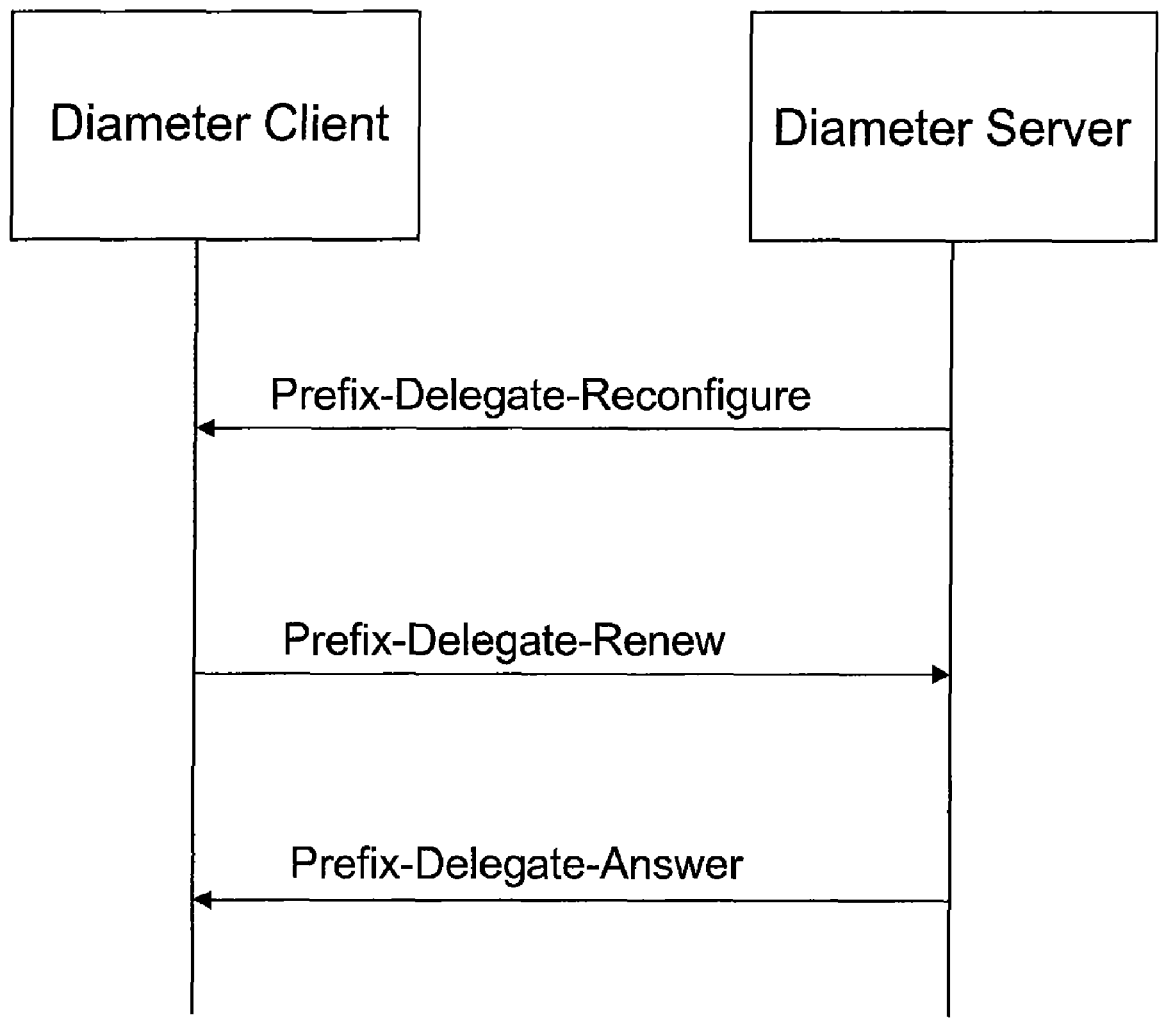
FIG. 2 is a message flow diagram illustrating a process of renumbering according to the present invention.

In further embodiments, a feature of renumbering prefixes may be included. In particular, renumbering prefixes is important for IPv6. FIG. 2 shows a flow scheme of renumbering according to the embodiments of the invention. A Diameter server sends a Prefix-Authorize-Reconfigure (PAC) message to initiate renumbering old prefixes. When receiving the PAC message, a Diameter client may send a Prefix-Authorize-Renew message to the Diameter server to acquire new prefixes and to reduce the lifetime for the old prefixes. The Diameter server may send a Prefix-Authorize-Answer (PAA) message with the new prefixes, while the old prefixes are also included in the PAA message with reduced lifetime.

Command-Code [I-D.ietf-dime-rfc3588bis] values must be supported by all Diameter implementations according to the embodiments of the present invention. The Command Codes are defined as follows:

| Command-Name | Abbreviation | Code |
|---|---|---|
| Prefix-Authorize-Request | PAR | TBD |
| Prefix-Authorize-Answer | PDA | TBD |
| Prefix-Authorize-Release | PAS | TBD |
| Prefix-Authorize-Renew | PAW | TBD |
| Prefix-Authorize-Reconfigure | PAC | TBD |

In one embodiment of the invention, a PA client may request arbitrary prefixes. A PA server allocates the arbitrary prefixes based upon a default policy. In another embodiment of the invention, the PA client may request preferable prefixes. The PA client may request designated prefixes with Authorized-Prefix AVP. For example, some PA users would prefer to have the same prefix for every network access. In this case, access routers may request an aggregate prefix from a PA server, and then further subnet the prefix for MNs.

The Prefix-Authorize-Request message may have the following format:

```
<Prefix-Authorize-Request) : : = < Diameter Header : XXX, REQ, PXY >
    < Session-ID >
    { Auth-Application-Id }
    { User-Name }
    { Destination-Realm }
    { Origin-Host }
    { Origin-Realm }
    { PrefixUserID }
    [ Authorized-Prefix ]
    [ NAS-Identifier ]
    [ NAS-IP-Address ]
    [ NAS-IPv6-Address ]
    [ NAS-Port-Type ]
    [ Authorization-Lifetime ]
    [ Auth-Session-State ]
    * [ Proxy-Info ]
    * [ Route-Record ]
    * [ AVP ]
```

In the Diameter header, REQ 'R' bit in the Command Flags is set to indicate that the Diameter message is a request, as opposed to the case where the message is an answer. PXY 'P' bit in the Command Flags is set to mean proxiable. XXX is the command code to be assigned by Internet Engineering Task Force (IETF).

The Diameter message conventions are provided here. For example, convention <AVP> defines a fixed position of an AVP. Convention {AVP} indicates that AVP must be present and can appear anywhere in the Diameter message. Convention [AVP] indicates that AVP is optional. Convention *[AVP] means that any number of the AVP is allowed, including zero. The added brackets < >, { }, [ ] and *[ ] provide various meanings for the parameter inside the brackets.

Furthermore, the Prefix-Authorize-Request (PAR), as indicated by the Command-Code field that is set to TBD (to be assigned to IANA). The Auth-Application-ID field of the Diameter Header must be set to the Diameter Prefix authorization Application (to be assigned to IANA).

PrefixUserID is used for managing prefixes. PrefixUserID is unique for a PA client. Different PrefixUserIDs may have different prefixes.

The Prefix-Authorize-Answer (PAA), indicated by the Command-Code field set to TBD, is sent by a PA server as a response message to the Prefix-Authorize-Request message, the Prefix-Authorize-Release message and the Prefix-Authorize-Renew message. The 'R' bit is cleared in the Command Flags field. PrefixUserID and AVPs are included. Furthermore, Authorized-Prefix AVP are included in the PAA if there is a successful operation for sending the Prefix-Authorize-Request message or Prefix-Authorize-Renew message. The Authorized-Prefix AVP may be included in the PAA if the PAA message is a response to a Prefix-Authorize-Release message. Result-Code is included to indicate result of an operation. The Prefix-Authorize-Answer message may have the format as shown below:

```
<Prefix-Authorize-Answer> : : = < Diameter Header: XXX, PXY >
    < Session-Id >
    { Auth-Application-Id }
    { Result-Code }
    { Origin-Host }
    { Origin-Realm }
    { PrefixUserID }
    { Authorized-Prefix }
    [ User-Name ]
    [ Authorization-Lifetime ]
    [ Auth-Session-State ]
    [ Error-Message ]
    [ Error-Reporting-Host ]
    [ Origin-State-Id ]
    * [ Proxy-Info ]
    * [ AVP ]
```

The Prefix-Authorize-Release, indicated by the Command-Code field set to TBD and the 'R' bit set in the Command Flags field, is sent by a PA client in order to return prefixes to a PA server. PrefixUserID and Authorized-Prefix AVPs are included. The Prefix-Authorize-Release message format may be shown below:

```
<Prefix-Authorize-Release> : : = < Diameter Header: XXX, REQ, PXY >
    < Session-ID >
    { Auth-Application-Id }
    { User-Name }
    { Destination-Realm }
    { Origin-Host }
    { Origin-Realm }
    { PrefixUserID }
    { Authorized-Prefix }
    [ NAS-Identifier ]
    [ NAS-IP-Address ]
    [ NAS-IPv6-Address ]
    [ NAS-Port-Type ]
    [ Authorization-Lifetime ]
    [ Auth-Session-State ]
    * [ Proxy-Info ]
    * [ Route-Record ]
    * [ AVP ]
```

The Prefix-Authorize-Renew, indicated by the Command-Code field set to TBD and the 'R' bit set in the Command Flags field, is sent by a PA client, in order to refresh the lifetime for prefixes as presented in the Authorized-Prefix AVP. PrefixUserID and Authorized-Prefix AVPs are included.

The Prefix-Authorize-Renew message may have the following format:

```
<Prefix-Authorize-Renew> : : = < Diameter Header: XXX, REQ, PXY >
    < Session-ID >
    { Auth-Application-Id }
    { User-Name }
    { Destination-Realm }
    { Origin-Host }
    { Origin-Realm }
    { PrefixUserID }
    { Authorized-Prefix }
    [ NAS-Identifier ]
    [ NAS-IP-Address ]
    [ NAS-IPv6-Address ]
    [ NAS-Port-Type ]
    [ Authorization-Lifetime ]
    [ Auth-Session-State ]
    * [ Proxy-Info ]
    * [ Route-Record ]
    * [ AVP ]
```

The Prefix-Authorize-Reconfigure, indicated by the Command-Code field set to TBD and the 'R' bit set in the Command Flags field, is sent by a PA server, in order to trigger a PA client to renew old prefixes by extending the lifetime of the old prefixes or to get new prefixes for renumbering while the lifetime for the old prefixes may be reduced or expired. PrefixUserID AVP is included.

When a network being used for a long time needs to be in service and a new network will replace the old network. This situation would require a new prefix authorization. A renumbering feature will be used in such a situation when a new network is used to replace an old network regardless of reasons for the replacement.

The Prefix-Authorize-Reconfigure message may have the format as shown below:

```
<Prefix-Authorize-Reconfigure> : : = < Diameter Header: XXX,
    REQ, PXY >
        < Session-ID >
        { Auth-Application-Id }
        { User-Name }
        { Destination-Realm }
        { Origin-Host }
        { Origin-Realm }
        { PrefixUserID }
        { NAS-Identifier }
        [ NAS-IP-Address ]
        [ NAS-IPv6-Address ]
        [ NAS-Port-Type ]
        * [ Proxy-Info ]
        * [ Route-Record ]
        * [ AVP ]
```

Diameter AVPs may have the format as shown in FIG. 3, where N stands for "no", while Y stands for "yes". M stands for mandatory, P for protected, and V for vendor specific.

One embodiment with PrefixUserID is disclosed. The PrefixUserID (AVP Code TBD) is of type Unsigned64 and contains the user identifier information. A PA server manages prefixes based on the PrefixUserID.

The Authorized-Prefix (AVP Code TBD) is of type Octetstring that contains prefix information. Authorized-Prefix may be defined as an extended attribute in RADIUS [I-D.ietf-ratext-extended-attributes]. Diameter AVP is an identical attribute with the same type of value.

Each prefix may belong to an aggregate prefix. An extension of the aggregate prefix is a dedicated prefix. For example, if a PA client applies a 48-bits aggregate prefix, both the aggregate prefix and the dedicated prefix have prefix length of 48-bits. If a PA server allocates a 64-bits dedicated prefix to a PA client, where the 64-bits dedicated prefix belongs to a 48-bits aggregate prefix, a length of the aggregate prefix in the attribute should be 48-bits, while the length of the dedicated prefix should be 64-bits. The PA client broadcasts information of aggregate prefix upstream for traffic routing.

Figure 4:
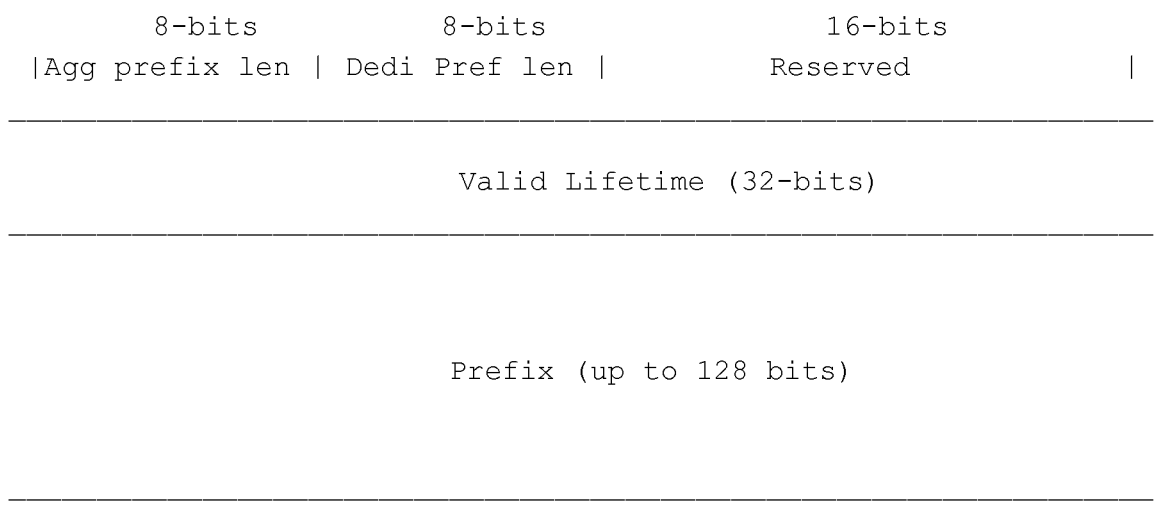
FIG. 4 illustrates an exemplary structure of Authorized-Prefix AVP.

The prefix includes an aggregate prefix and a dedicated prefix. FIG. 4 illustrates a structure of authorized-prefix AVP. The Authorized-Prefix includes prefix with valid lifetime. In FIG. 4, the aggregation prefix length field is 8-bits, followed by the dedicated prefix length field of 8-bits. There are 16-bits reserved for the prefix. The valid lifetime has 32-bits and covers the entire prefix that has a total length of either the aggregate prefix, or the dedicated prefix. The prefix may have a length up to 128-bits.

Table 1 presents the AVPs that may be used in the present invention. The following symbols are defined as follows:

symbol 0 stands for that the AVP must not be present in a message;

symbol 0+ stands for that zero or more instances of the AVP may be present in a message;

symbol 1 stands for that one instance of the AVP must be present in a message; and symbol 1+ stands for at least one instance of the AVP MUST be present in a message.

where the message may be PAR, PDA, PAS, PAW or PAC as listed in Table 1.

TABLE 1

AVPs in Various Messages

| Attribute Name | Command | | | | |
| --- | --- | --- | --- | --- | --- |
|  | PAR | PAA | PAS | PAW | PAC |
| PrefixUserID | 1 | 1 | 1 | 1 | 1 |
| Authorized-Prefix | 0+ | 0+ | 1+ | 1+ | 0 |

The present invention may use values from the Command Code namespace defined in [I-D.ietf-dime-rfc3588bis] for messages, such as Prefix-Authorize-Request, Prefix-Authorize-Answer, Prefix-Authorize-Release, Prefix-Authorize-Renew, and Prefix-Authorize-Reconfigure.

The present invention may use values from AVP value namespace as defined in [I-D.ietf-dime-rfc3588bis] for an attribute PrefixUserID and a Authorized-Prefix. Furthermore, the present invention also uses the value TBD to the Application Identifier namespace as defined in [I-D.ietf-dime-rfc3588bis].

Embodiments of the invention provide a device for Diameter Application for prefix authorization. The device includes a processor, at least two or more network interfaces, and a memory coupled with the processor where the memory includes a computer readable medium having a computer-readable program for directing operation of the device. The computer readable program includes instructions for sending a request message for prefix authorization and instructions for receiving an answer message, where the answer message includes a first prefix with a first lifetime.

The following references are incorporated herein by reference for all purposes:

[RFC2119] Bradner, S., "Key words for use in RFCs to Indicate Requirement Levels", BCP 14, RFC 2119, March 1997.

[RFC4072] Eronen, P., Hiller, T., and G. Zorn, "Diameter Extensible Authentication Protocol (EAP) Application", RFC 4072, August 2005.

[I-D.ietf-dime-rfc3588bis] Fajardo, V., Arkko, J., Loughney, J., and G. Zorn, "Diameter Base Protocol", draft-ietf-dime-rfc3588bis-12 (work in progress), September 2008.

[I-D.ietf-radext-extended-attributes] Li, Y., Lior, A., and G. Zorn, "Extended Remote Authentication Dial In User Service (RADIUS) Attributes", draft-ietf-radext-extended-attributes-04 (work in progress), July 2008.

[802.16e] Institute of Electrical and Electronics Engineer, "Amendment for Physical and Medium Access Control Layers for Combined Fixed and Mobile Operation in Licensed Bands", IEEE 802.16e/D12.

[RFC5121] Patil, B., Xia, F., Sarikaya, B., Choi, JH., and S. Madanapalli, "Transmission of IPv6 via the IPv6 Convergence Sublayer over IEEE 802.16 Networks", RFC5121, February 2008.

[RFC4968] Madanapalli, S., "Analysis of IPv6 Link Models for 802.16 Based Networks", RFC 4968, August 2007.

[RFC3963] Devarapalli, V., Wakikawa, R., Petrescu, A., and P. Thubert, "Network Mobility (NEMO) Basic Support Protocol", RFC 3963, January 2005.

[I-D.ietf-nemo-dhcpv6-pd] Droms, R. and P. Thubert, "DHCPv6 Prefix Delegation for NEMO", draft-ietf-nemo-dhcpv6-pd-03 (work in progress), December 2007.

[I-D.ietf-dime-app-design-guide] Fajardo, V., Asveren, T., Tschofenig, H., McGregor, G., and J. Loughney, "Diameter Applications Design Guidelines", draft-ietf-dime-app-design-guide-07 (work in progress), July 2008.

[RFC5213] Gundavelli, S., Leung, K., Devarapalli, V., Chowdhury, K., and B. Patil, "Proxy Mobile IPv6", RFC 5213, August 2008.

[RFC4818] Salowey, J. and R. Droms, "RADIUS Delegated-IPv6-Prefix Attribute", RFC 4818, April 2007.

[RFC3633] Troan, O. and R. Droms, "IPv6 Prefix Options for Dynamic Host Configuration Protocol (DHCP) version 6", RFC 3633, December 2003.

The previous disclosed embodiments are provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a Prefix Authorization (PA) client for Diameter prefix authorization, comprising:
   sending a request for a prefix to a PA server;
   receiving an answer message from the PA server to obtain a first prefix with a first lifetime in response to the request;
   the PA client sending a message to the PA server requesting reducing the first lifetime of the first prefix; and
   receiving a further answer message from the PA server in response to sending the message to the PA server, wherein the answer message includes a reduced first lifetime of the first prefix, which is a non-zero value less than the first lifetime, wherein the PA server comprises an AAA server with Diameter Extensible Authentication protocol (EAP) for authentication and an AAA server with PA for Diameter prefix authorization.

2. The method of claim 1 further comprising:
   sending the first prefix to a PA user;
   detaching the PA user from the PA client; and
   sending a release message to the PA server.

3. The method of claim 1 further comprising:
   receiving a message requesting IPv6 address renumbering from the PA server;
   sending a message to the PA server to acquire a second prefix; and
   receiving the second prefix from the PA server with an answer message with a second lifetime, the second prefix being different from the first prefix.

4. The method of claim 1, wherein the PA client comprises access routers, local mobility anchors, or home agents.

5. The method of claim 2, wherein the PA user comprises mobile nodes or mobile routers.

6. The method of claim 1, wherein the prefix comprises a unique prefix being used by a mobile node in a point-to-point model.

7. The method of claim 1, wherein the PA client comprises a Diameter client, and the PA server comprises a Diameter server.

8. The method of claim 1, further comprising:
   sending a renew message to the PA server after the first lifetime expires to acquire a second lifetime of the first prefix; and
   receiving an answer message from the PA server with the second lifetime.

9. The method of claim 8, wherein the second lifetime is different from the first lifetime.

10. A system for Diameter Application for prefix authorization, the system comprising:
    a Prefix-Authorization (PA) client having a processor, memory coupled to the processor, and a network interface configured to communicate with a Prefix-Authorization (PA) server, wherein the PA server uses Diameter Prefix Authorization for Diameter prefix authorization to the PA client, wherein
       the PA client is configured to send a request for a prefix to the PA server,
       the PA client is configured to receive an answer message from the PA server, the answer message having a first prefix with a first lifetime,
       the PA client is configured to communicate with at least one PA user,
       the PA client is configured to request a reduced lifetime of the first prefix from the PA server,
       the PA client is configured to receive an answer message from the PA server, wherein the answer message includes a reduced first lifetime of the first prefix, which is a non-zero value less than the first lifetime, wherein the PA server comprises an AAA server with Diameter Extensible Authentication protocol (EAP) for authentication and an AAA server with PA for Diameter prefix authorization.

11. The system of claim 10, wherein:
    the PA client sends the first prefix to the PA user;
    the PA client detaches from the PA user; and
    PA client is configured to send a release message to the PA server.

12. The system of claim 10, wherein:
    the PA client is configured to receive a message from the PA server, the message initiating IP address renumbering;
    the PA client is configured to send a message to the PA server to acquire a second prefix; and
    the PA client is configured to receive the second prefix from the PA server with an answer message with a second lifetime, the second prefix being different from the first prefix.

13. The system of claim 10, wherein the PA client comprises access routers, local mobility anchors, or home agents.

14. The system of claim 10, wherein the PA user comprises mobile nodes or mobile routers.

15. The system of claim 10, wherein the PA user is attached or detached to the PA client.

16. The system of claim 10, wherein the PA client comprises a Diameter client, and the PA server comprises a Diameter server.

17. A Device for Diameter Application for prefix authorization, the device
comprising a processor, at least two or more network interfaces, and a memory coupled with the processor, and the memory comprising a non-transitory computer-readable medium having a computer-readable program embodied therein for directing operation of the device, the computer readable program including:
instructions for sending a request message for prefix authorization; and
instructions for receiving an answer message, the answer message comprising a first prefix with a first lifetime;
instructions for a client sending a request for a reduced lifetime of the first prefix to a server; and
instructions for receiving an answer message comprising the reduced lifetime of the first prefix, wherein the answer message includes a reduced first lifetime of the first prefix, which is a non-zero value less than the first lifetime, wherein the PA server comprises an AAA server with Diameter Extensible Authentication protocol (EAP) for authentication and an AAA server with PA for Diameter prefix authorization.

18. The device of claim 17, wherein the request message is sent to a prefix authorization (PA) server from a PA client.

19. The device of claim 18, wherein the computer readable program further including:
instructions for initiating IPv6 address renumbering by sending a message for renumbering from the PA server;
instructions for receiving the message by the PA client;
instructions for sending a message to the PA server to acquire a second prefix; and
instructions for receiving the second prefix from the PA server with an answer message with a second lifetime, the second prefix being different from the first prefix.

20. The device of claim 19, wherein the computer readable program further including instructions for communicating with a prefix authorization (PA) user.

21. The device of claim 20, wherein the computer readable program further includes:
instructions for detaching the device by the PA user, the PA user receiving the first prefix from the device; and
instructions for sending a release message to the PA server.

22. A method of operating a Prefix Authorization (PA) server for Diameter prefix authorization, the method comprising:
receiving a request for a prefix from a PA client;
replying with an answer message to the PA client to provide a first prefix with a first lifetime in response to the request;
receiving a request from the PA client for a reduced first lifetime of the first prefix; and
replying with an answer message to the PA client to provide a reduced first lifetime of the first prefix in response to the request for the reduced first lifetime, the reduced first lifetime of the first prefix being a non-zero value less than the first lifetime, wherein the PA server comprises an AAA server with Diameter Extensible Authentication protocol (EAP) for authentication and an AAA server with PA for Diameter prefix authorization.

23. The method of claim 22, further comprising receiving a release message from the PA client indicating that a PA user has been detached from the PA client.

24. The method of claim 22, further comprising:
sending a message requesting IPv6 address renumbering to the PA client;
receiving a message from the PA client to acquire a second prefix; and
sending the second prefix to the PA client with an answer message with a second lifetime, the second prefix being different from the first prefix.

25. A system for Diameter Application for prefix authorization, the system comprising:
a Prefix-Authorization (PA) server having a processor, memory coupled to the processor, and a network interface, wherein the PA server uses Diameter Prefix Authorization for Diameter prefix authorization to a PA client, the Diameter prefix authorization comprising:
instructions to receive a request for prefix by a Prefix Authorization (PA) client; and
instructions to reply with an answer message by the PA server to the PA client to provide a first prefix with a first lifetime,
instructions to receive a request for a reduced first lifetime for the first prefix from the PA client,
instructions to reply with an answer message by the PA server to the PA client to provide a reduced first lifetime for the first prefix, wherein the answer message includes a reduced first lifetime of the first prefix, which is a non-zero value less than the first lifetime, wherein the PA server comprises an AAA server with Diameter Extensible Authentication protocol (EAP) for authentication and an AAA server with PA for Diameter prefix authorization.

26. The system of claim 25, wherein the PA server has instructions to receive a release message from the PA client, the release message indicating that a PA user has been released from the PA client.

27. The system of claim 25, wherein:
the PA server has instructions to initiate IP address renumbering by sending a message for renumbering to the PA client;
the PA server has instructions to receive a message from the PA client to acquire a second prefix; and
the PA server has instructions to send the second prefix to the PA client in an answer message having a second lifetime, the second prefix being different from the first prefix.

28. A Prefix-Authorization (PA) server device configured to:
run a Diameter Authentication Protocol;
receive a prefix authorize request command from a Prefix Authorization (PA) client when the PA client requests a new prefix;
transmit a prefix authorize answer commend to the PA client, the prefix authorize command comprising a prefix with a lifetime in response to a request for a new prefix and a reduced lifetime of an old prefix in response to a request for a reduction of the lifetime of the old prefix, wherein the reduced lifetime of the old prefix is a non-zero value less than the lifetime of the old prefix;
receive a prefix authorize release commend from the PA client, the prefix authorize release command signaling a request to return a prefix to the PA server device;

receive a prefix authorize renew commend from the PA client when the PA client requests, to renew a prefix and when the PA client requests a reduction of a lifetime of an old prefix; and transmit a prefix authorize reconfigure command to the PA client, the prefix authorize reconfigure command signaling the PA client to renew old prefixes or get new prefixes for renumbering, wherein the PA server device comprises a processor, memory coupled to the processor, and a network interface, wherein the PA server device comprises an AAA server with Diameter Extensible Authentication protocol (EAP) for authentication and an AAA server with PA for Diameter prefix authorization.

29. A Prefix-Authorization (PA) client device configured to:

run a Diameter Authentication Protocol;

transmit a prefix authorize request command to a Prefix Authorization (PA) server when the PA client device requests a new prefix;

receive a prefix authorize answer commend from the PA server, the prefix authorize command comprising a prefix with a lifetime in response to a request for a new prefix and a reduced lifetime of an old prefix in response to a request for a reduction of the lifetime of the old prefix, wherein the reduced lifetime of the old prefix is a non-zero value less than the lifetime of the old prefix;

transmit a prefix authorize release commend to the PA server, the prefix authorize release command signaling a request to return a prefix to the PA server;

transmit a prefix authorize renew commend to the PA server when the PA client device requests to renew a prefix and when PA client device requests a reduction of a lifetime of an old prefix; and receive a prefix authorize reconfigure command from the PA server, the prefix authorize reconfigure command signaling the PA client device to renew old prefixes or get new prefixes for renumbering, wherein the PA client device comprises a processor, memory coupled to the processor, and a network interface, wherein the PA server comprises an AAA server with Diameter Extensible Authentication protocol (EAP) for authentication and an AAA server with PA for Diameter prefix authorization.

30. The PA client device of claim 29, wherein the prefix authorize renew command comprises an authorization lifetime variable and an Attribute-Value Pair (AVP) having an associated prefix user identifier (PrefixUserlD) that is unique for a PA client.

31. The PA client device of claim 29, wherein the PA client device sets request bit in a command flag of the prefix authorize renew command to signal a request to renew a prefix or to signal a request by the PA client device to reduce a lifetime of an old prefix.

32. The PA client device of claim 29, wherein the new prefix and the old prefix each comprises an aggregate prefix and a dedicated prefix, and wherein the PA client device is further configured to transmit the aggregate prefix upstream for traffic routing.

33. The PA client device of claim 32, wherein the PA client device is configured to transmit only the aggregate prefix upstream.

* * * * *